United States Patent [19]

Kanerva

[11] Patent Number: 4,553,255

[45] Date of Patent: Nov. 12, 1985

[54] REGULATING AND STABILIZING CIRCUIT FOR X-RAY SOURCE

[75] Inventor: Heikki Kanerva, Helsinki, Finland

[73] Assignee: Philips Medical Systems, Shelton, Conn.

[21] Appl. No.: 638,545

[22] Filed: Aug. 7, 1984

Related U.S. Application Data

[63] Continuation of Ser. No. 215,582, Dec. 11, 1980, which is a continuation of Ser. No. 940,760, Sep. 8, 1978.

[30] Foreign Application Priority Data

Sep. 23, 1977 [FI] Finland ........ 772806

[51] Int. Cl.[4] ........ G03B 41/16

[52] U.S. Cl. ........ 378/110; 378/112

[58] Field of Search ........ 378/111, 112, 110, 109, 378/108

[56] References Cited

U.S. PATENT DOCUMENTS

| | | | |
|---|---|---|---|
| 3,783,287 | 1/1974 | Fulton | 378/112 |
| 3,828,194 | 8/1974 | Grasser | 378/112 |
| 3,909,662 | 9/1975 | Thomas | 315/107 |
| 3,967,159 | 6/1976 | Dendy | 315/308 |
| 3,974,387 | 8/1976 | Bronner | 378/112 |
| 4,101,776 | 7/1978 | Mansfield | 378/111 |
| 4,234,793 | 11/1980 | Amtmann | 378/110 |
| 4,402,086 | 8/1983 | Setbon | 378/110 |

FOREIGN PATENT DOCUMENTS

| | | |
|---|---|---|
| 1064917 | 4/1967 | United Kingdom . |
| 1458172 | 12/1976 | United Kingdom . |

*Primary Examiner*—Craig E. Church

*Attorney, Agent, or Firm*—Marc D. Schechter

[57] ABSTRACT

A method and apparatus for regulating and stabilizing the radiation intensity level of an X-ray source. The apparatus includes high voltage circuitry for supplying anode and cathode voltages to an X-ray tube and filament voltage circuitry for supplying voltage to the filament of the tube. Both the high voltage and filament voltage circuitry are regulated by multiple feedback voltage level control circuits. The method of the present invention involves the forming of the high voltage and filament voltage circuitry and the supplying of appropriate feedback signals to such circuitry to maintain the high voltages and filament voltage at desired levels.

16 Claims, 4 Drawing Figures

REGULATING AND STABILIZING CIRCUIT FOR X-RAY SOURCE

This is a continuation of application Ser. No. 215,582, filed Dec. 11, 1980, which was a continuation of Ser. No. 940,760, filed Sept. 8, 1978.

BACKGROUND OF THE INVENTION

1. Field of the Invention

The present invention relates in general to methods and apparatus for regulating and stabilizing the radiation intensity level of an X-ray source. The invention more specifically relates to such methods and apparatus that employ feedback circuitry for achieving such regulation and stabilization.

2. Description of the Prior Art

The radiation intensity of an X-ray source depends on the voltage potential between the anode and the cathode as well as the anode current of the X-ray tube. Thus, it is possible to control the radiation intensity level of the X-ray tube by controlling either the anode voltage or the anode current. It is not immaterial which one of these quantities one controls, because their effects on the characteristics of the radiation emitted by the tube are different. The anode voltage mainly controls the energy distribution of photons, i.e., the penetration of the radiation, whereas the anode current controls the number of photons emitted in a given time period.

Apart from the peak and average voltage levels, the wave forms of these voltages also have a considerable effect on the properties of the X-ray radiation. It is well known that in some applications of medical X-ray diagnostics considerable advantages are achieved if the anode voltage of the X-ray tube is as pure direct voltage as possible.

A practical method to make the anode voltage smooth, and both the anode and filament voltages adjustable has turned out to be a system in which the power supply voltage feeding the X-ray tube is at first modified to a crude DC voltage and is then modified with a controllable means into an adjustable DC voltage. This adjustable DC voltage is converted to an AC voltage of appropriate frequency and amplitude. The DC anode voltage for the tube is then formed from such AC voltage by means of a voltage multiplier comprising for example, capacitors and rectifying elements.

For forming the filament voltage, a system that is partially similar to the anode voltage supply may be used. The filament voltage supply differs from the anode voltage circuit in that the output voltage of the corresponding DC-AC converter is directly fed through an appropriate isolation transformer to the filament of the X-ray tube.

In the above-described system, both the anode voltage and the anode current (filament voltage) are set and adjusted through appropriate circuitry to make them remain constant, in principle. One possible way to stabilize the anode voltage is to use a single control loop where the feedback signal is taken directly from the anode voltage of the X-ray tube.

There are a few drawbacks in the arrangements described above are apparent when applying the system in practice. In the first place, the anode voltage and current do not stay constant even though the corresponding DC voltages feeding the DC-AC converters are stabilized. This is because, among other things, certain components between the regulating means and the controllable voltage X-ray tube are sensitive to heat. A second drawback is that when using feedback directly from the X-ray tube, the control loop must, because of stability, be set so slow that the supply frequency ripple contained by the crude DC voltage can still be detected in the high voltage. For the same reason (to maintain stability), the high voltage rise time during the switch-on of the device must be set too long to be favorable from the point of view of most applications.

SUMMARY OF THE INVENTION

In order to overcome the drawbacks of the prior art, according to the present invention the anode voltage feedback signal operates, in the fashion of a follow-up control, on the difference signal of an inner feedback control circuit of the regulating system.

The present invention is to a method for regulating and stabilizing the radiation intensity level of an X-ray source. In the method, the intensity level is regulated by forming a feedback signal from the anode voltage and/or anode current or from quantities proportional thereto for regulating the anode and/or filament voltage. An essential feature of the method of the present invention is that, for regulating and stabilizing the anode voltage and/or current, there is a regulating circuit resembling a follow-up control system and comprising outer and inner control circuits.

The inner control circuit may be set fast enough to be able to compensate for alterations in the supply voltage and the outer control circuit may be set slow enough for appropriate stability. An advantage of such circuitry is that, when switching on the radiation source, it is possible to connect a temporary reference signal to the inner control circuit by by-passing the outer control circuit. In this way it is possible to speed up final balancing of the system.

In addition, the present invention relates to an X-ray source in which the method defined above is applied. The source comprises an X-ray tube with an anode and a cathode, a high voltage source, and a filament voltage source. At least one of the sources is equipped with a controllable voltage regulating means in order to form an electrical signal that acts on the X-ray tube. The controllable voltage regulating means forms an electrical signal from the voltage of the power source, the corresponding electrical signal acting on the X-ray tube is proportional to this regulated signal.

The main characteristic feature of the radiation source in accordance with the invention is that the control input of the controllable voltage regulating means is connected to the output of a first comparing means. The first comparing means has one input connected via a first feedback circuit to the output of the controllable voltage regulating means, and has another input connected to the output of a second comparing means. The second comparing means has one input connected to a second feedback circuit that forms a feedback signal from the anode voltage of the X-ray tube, and has another input connected to a reference signal source, whose signal is proportional to the desired value of the anode voltage.

DETAILED DESCRIPTION OF THE INVENTION

Figure 1:
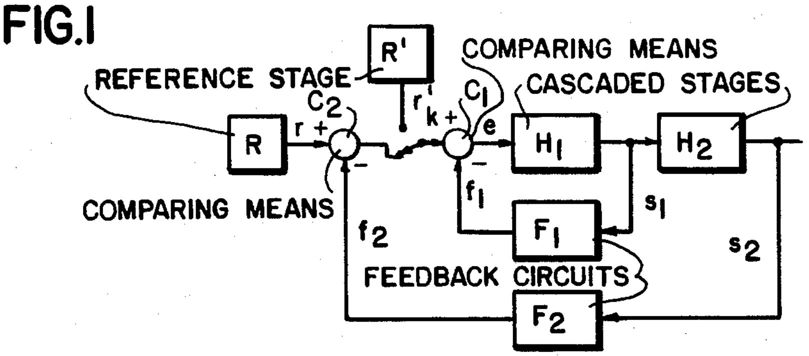
FIG. 1 is a block diagram showing the control principle of the regulating and stabilizing method of the present invention.

According to FIG. 1 the anode voltage of an X-ray tube and/or the filament voltage (anode current) is formed by means of two cascaded stages $H_1$ and $H_2$. From the output signals $s_1$ and $s_2$ of these stages one derives, by means of corresponding feedback circuits $F_1$ and $F_2$, feedback signals $f_1$ and $f_2$. The feedback signal are associated with comparing means $C_1$ and $C_2$ by inner and outer feedback control circuits $H_1F_1$ and $H_2F_2$, respectively, in such manner so as to conduct feedback signal $f_1$ to comparing means $C_1$, whose difference signal e controls the stage $H_1$. Feedback signal $f_1$ of the inner control circuit $H_1F_1$ is compared with the output signal of the comparing means $C_2$. The output signal of comparing means $C_2$ is proportional to the difference between signal r of a reference stage R and feedback signal $f_2$ of the outer control circuit $H_2F_2$. The outer control circuit may be bypassed with a switch K that switches signal r' of reference R' over to be the reference signal of comparing means $C_1$.

Figure 2:
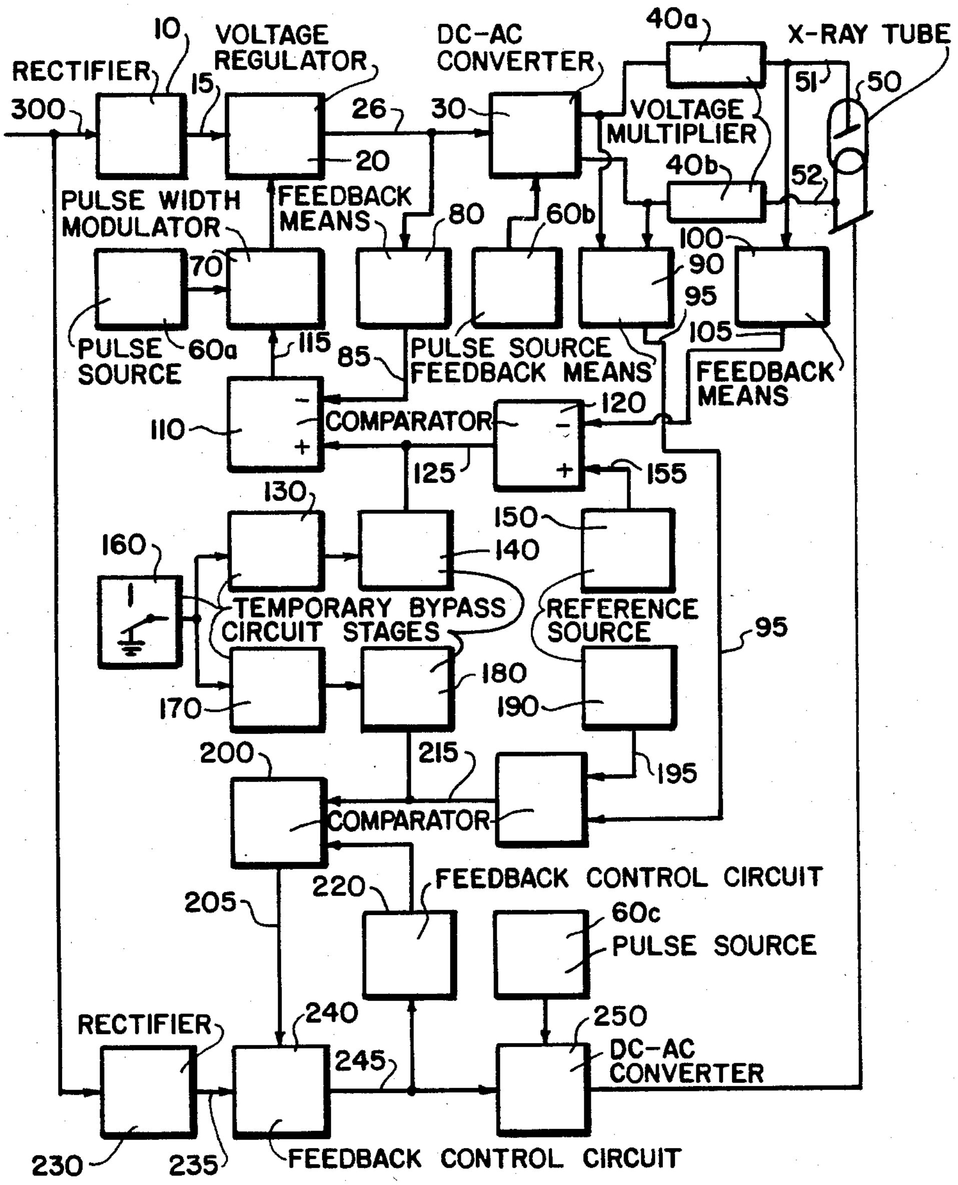
FIG. 2 is a block diagram of a control circuit for an X-ray source which the radiation intensity is regulated and stabilized according to the method of the present invention.
Figure 3:
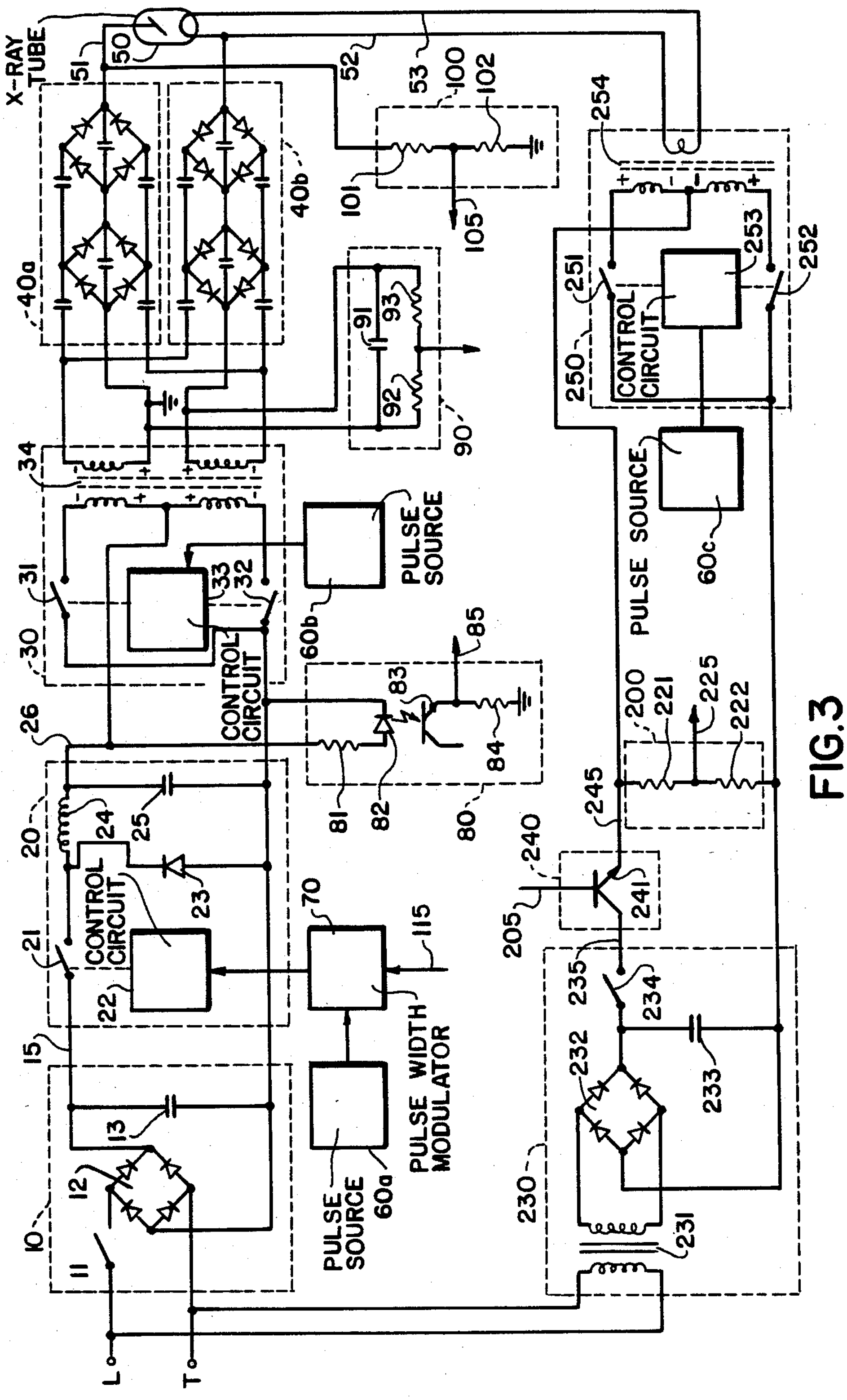
FIG. 3 is a schematic diagram showing how the high voltage and the filament voltage are formed in a radiation source in accordance with FIG. 2, and how various feedback signals are formed.

An X-ray source of FIGS. 2 and 3 is connected to an external power source (not shown) via input 300. The alternating supply voltage from such power source is connected via switch arms 302 and 303 (FIG. 3) of a switch 301 to a rectifying stage 10 of a high voltage source and to a rectifier stage 230, of a filament voltage source. The X-ray source is grounded via a ground connection 304.

The rectifier stage 10 of the high voltage source contains a switch 11, a rectifier 12, and a filtering condenser 13. An output voltage 15 from the stage 10 is fed to a controllable voltage regulating stage 20. Stage 20 comprises a switch 21, a control circuit 22 that controls the switch 21, a diode 23, coil 24, and a condenser 25. An output voltage 26 of the regulating stage 20 depends on the voltage 15 and on the duty cycle of the switch 21 that opens and closes periodically. The switch 21 can be for instance a switching transistor, in which case the control circuit 22 may contain an appropriate isolating, amplifying, and shaping means to reshape pulses obtained from a pulse width modulator (PWM) 70 to make them fit for actuating the switch 21.

The output voltage 26 of the regulating means 20 is supplied to a DC-AC converter stage 30. Stage 30 contains switches 31 and 32 that switch on and off periodically in alternating phases, a control circuit 33 for controlling the switches 31 and 32, and a push-pull transformer 34. The control circuit 33 receives a pulse control signal from a pulse source 60*b*.

The secondary windings of the transformer 34 feed in alternating phases two parallel connected voltage multipliers 40*a* and 40*b*. Of the two voltage multipliers, voltage multiplier 40*a* creates a positive high voltage as compared with the ground, and this voltage is connected to an anode 51 of an X-ray tube 50. Similarly, voltage multiplier 40*b* creates a negative high voltage as compared with the ground, and this high voltage is connected to a cathode 52 of the tube 50. Both voltage multipliers include two cascades, one composed of condensers $C_{ij}$, and rectifying bridges $D_{ij}$ and the other of condensers $C_j$, and rectifying elements $D_{ij}$.

The circuitry described above, thus, provides the high voltages for the anode and cathode of the tube 50, but such voltages are determined by feedback circuitry that will be described later.

Turning now to the circuitry for providing the filament voltage for the tube 50, a DC voltage 235 (FIGS. 2 and 3) is supplied from a rectifier stage 230. Stage 230 includes, as shown in FIG. 3, a transformer 231, a rectifier 232, a filtering condenser 233, and a switch 234. The DC voltage 235 is fed to a controllable voltage regulating stage 240 that includes a series transistor 241, controlled by a signal 205.

A regulated DC voltage 245 is fed from the transistor 241 to a DC-AC converter 250 Converter 250 comprises switches 251 and 252, a control circuit 253 for the switches, and a push-pull transformer 254. The switches 251 and 252 receive a periodical alternate-phase pulse control signal via the control circuit 253 from a pulse source 60*c*. The AC voltage obtained from the secondary coil of the transformer 254 forms the filament voltage which is directly fed into a filament 52, 53 of the X-ray tube 50.

The feedback circuitry for the above circuits will now be discussed beginning with a feedback means 80 (FIG. 3) that forms a feedback signal 85 from the regulated DC voltage 26. The means 80 comprises a resistor 81, light emitting diode (LED) 82, a light responsive transistor 83 optically coupled with the LED 82, and a resistor 84.

A voltage feedback signal 105 is created by a feedback means 100. Feedback means 100 includes a voltage dividing network having resistors 101 and 102 connected between the anode 51 and ground. The feedback signal 105 is proportional to the voltage between the anode 51 and the cathode 52, as the potentials of the anode and the cathode are symmetrical in relation to the ground potential.

A feedback signal 95 is proportional to the anode current and is formed in a feedback means 90 connected between the center inputs of the voltage multipliers 40*a* and 40*b*. It can be shown that the DC component of the current through these center inputs is equal to the anode current of the X-ray tube 50. A condenser 91 shunts the AC component of the current flowing through the means 90 past a voltage divider network formed of resistors 92 and 93, in which the actual feedback signal 95 is formed.

A feedback signal 225 proportional to the output voltage 245 of the regulating circuit 240 of the filament voltage circuitry is formed in feedback circuit 220 formed of a voltage dividing network having resistors 221 and 222.

The magnitudes of the anode and cathode high voltages are influenced by an input voltage 115 of the pulse width modulator 70. As such, the pulse width modulator 70 and the pulse source 60*a* connected to it are well-known components that are commercially available. The same applies to the pulse sources 60*b* and 60*c*. The pulse sources 60*a*, 60*b*, and 60*c* may also be combined to form one pulse center, in which case the regulating means 20 and the DC-AC converters 30 and 250 get synchronous control pulses.

The filament voltage of the X-ray tube 50 and hence its anode current are determined by the control signal 205 for the regulating circuit 240.

Two comparing circuits 110 and 120 (FIG. 2) and a reference voltage source 150 compose the means by which the feedback signals 85 and 105 of the high voltage circuitry influence the forming of the control signal 115. The comparing means 110 (FIG. 4) comprises an operational amplifier 111 and a feedback resistor 112. The comparing means 120 comprises an operational amplifier 121, a feedback resistor 122, and a resistor 123.

The feedback signal 105 ($f_2$) of the outer control circuit ($H_2F_2$) acts in the fashion of a follow-up control on the difference signal 115 of the inner feedback control circuit 70, 20, 80 ($H_1F_1$). Feedback signal 105 operates on difference signal 115 in the form of an output voltage 125 of the comparing circuit 120. Circuit 120 compares the signal 105 with a reference signal 155 of the reference source 150.

Thus, the anode voltage of the X-ray tube 50 tends to be regulated in such fashion that the feedback signal 105 of the high voltage corresponds with the value of the reference signal 155. Time constants of the inner and outer control circuits can be influenced by means of the feedback resistors 112 and 122.

Figure 4:
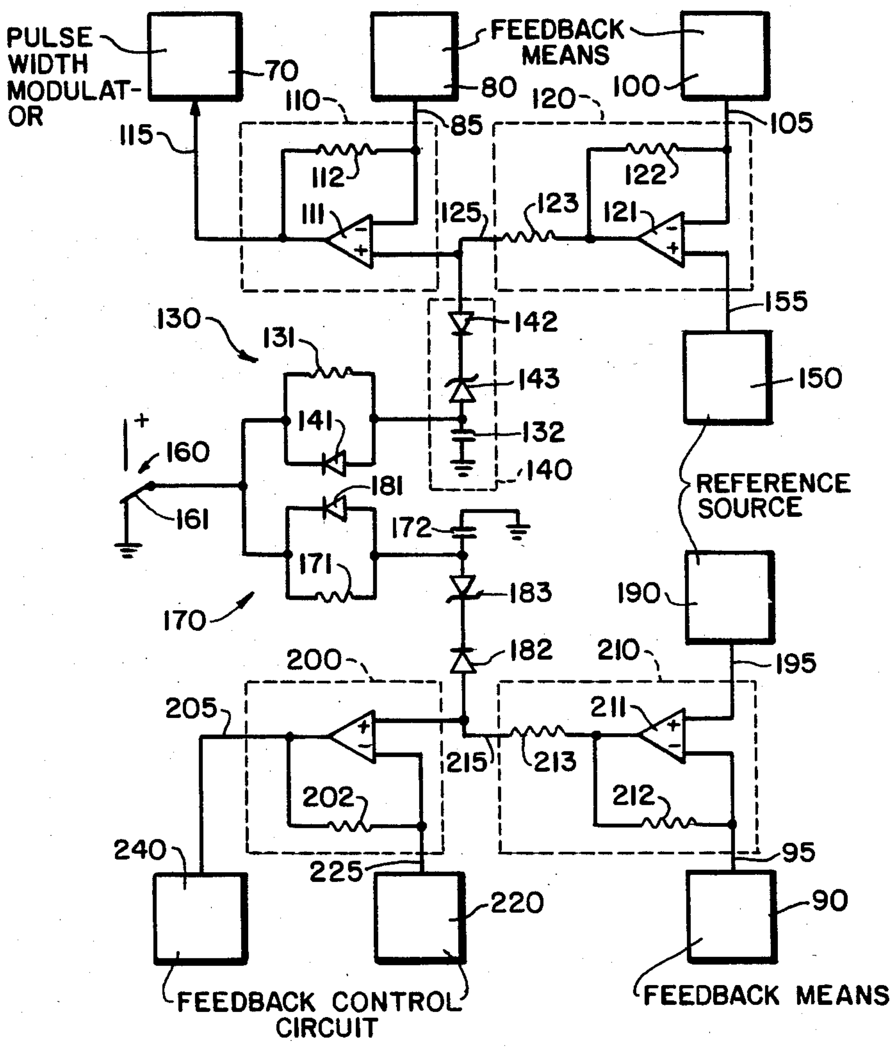
FIG. 4 is a schematic diagram showing how various control signals are formed in the X-ray source of FIGS. 2 and 3.

The control system of the filament voltage circuitry is of the same type as the control system of the high voltage circuitry. It comprises, as shown in FIGS. 2 and 4, comparing means 200 and 210 and a reference source 190. The comparing means 200 (FIG. 4) comprises an operational amplifier 201 and a feedback resistor 202. The comparing means 210 comprises operational amplifier 211, feedback resistor 212, and resistor 213.

As in the high voltage circuitry, the filament voltage circuitry feedback signal 95 operates in the fashion of a follow-up control on the difference signal 205 of the inner feedback control circuit 240, 220. Thus, the filament voltage is regulated by the feedback signal 95 of the anode current and the value of the reference signal 195. The filament of the X-ray tube has a certain thermal time constant, and the outer control circuit ($H_2F_2$) can be regulated with the resistor 212 to be appropriately slow compared with the time constant of the inner control circuit ($H_1F_1$). The time constant of the inner control circuit can be set with resistor 202.

When initially switching on the radiation source, both the outer control circuits of the high voltage control circuitry and the filament control circuitry can be bypassed temporarily. Stages 140, 130 and 160 (a first temporary bypass circuit) temporarily bypass the outer control circuit of the high voltage circuitry. Stages 180, 170 and 160 (a second temporary bypass circuit) temporarily bypass the outer control circuit of the filament voltage circuitry (FIG. 2).

Referring to FIG. 4, at the moment the X-ray source is turned on, a switch arm 161 of a switch 160 is switched from ground potential to an appropriate positive potential. Before switch 160 is turned on but after the switch 301 is turned on, the level of the signal 125 is the sum of the voltages across a reference diode 143 and diodes 142 and 141. At the switch-on moment switch 160 is turned on condenser 132 starts to be charged through resistor 131 on one hand, and through chain 123, 142, 143 on the other hand. When condenser 132 has been charged to the positive potential supplied through the switch 160, diode 142 is reverse biased and thus switches diode 143 and condenser 132 off from the control circuit.

Diodes 181, 182, 183, resistors 171, 213, and condenser 172, belonging to the filament voltage circuitry, operate in the same way when switch 160 is turned on.

The invention is by no means restricted to the aforementioned details, which are described only as an example.

What we claim is:

1. A method for regulating and stabilizing the radiation intensity level of an X-ray source including an X-ray tube, high voltage circuitry means for forming an electrical signal acting on the anode and cathode of said tube and filament power circuitry having a controllable means for supplying voltage to the filament of said tube, said method comprising:

(a) forming a feedback signal from the output of the controllable means in said filament power circuitry;

(b) forming a feedback signal from the anode current of the X-ray tube, or quantities proportional thereto;

(c) forming a control signal from said feedback signals; and (d) supplying said control signal to a control input of said controllable means.

2. A method of regulating and stabilizing the radiation intensity level of an X-ray source, said X-ray source comprising:

an X-ray tube having an anode, a cathode, and a filament;

high-voltage circuitry for supplying voltages to the anode and the cathode, said high-voltage circuitry including a controllable voltage regulating stage having a control input and an output; and filament power circuitry for supplying a voltage to the filament;

said method comprising the steps of:

forming a first feedback signal from the output of the controllable voltage regulating stage;

supplying the first feedback signal to a first input of a first comparing means having a first input, a second input and an output;

supplying the output of the first comparing means to the control input of the controllable voltage regulating stage;

forming a second feedback signal from the anode voltage or quantities proportional thereto;

supplying the second feedback signal to a first input of a second comparing means having a first input, a second input and an output;

supplying to the second input of the second comparing means a reference voltage signal proportional to the desired value of the voltage supplied to the anode and the cathode; and supplying the output of the second comparing means to the second input of the first comparing means.

3. An X-ray source comprising:

an X-ray tube having an anode, a cathode, and a filament;

high-voltage circuitry for supplying voltages to the anode and the cathode;

filament power circuitry for supply a voltage to the filament;

a controllable voltage regulating stage, said controllable voltage regulating stage being part of the filament power circuitry and having an output and a control input;

a first feedback circuit for supplying a first feedback signal from the output of the controllable voltage regulating stage;

a second feedback circuit for supplying a second feedback signal proportional to the filament current of the X-ray tube; and means for forming a control signal from the two feedback signals, said means supplying the control signal to the control input of the controllable voltage regulating stage.

4. A method of regulating and stabilizing the radiation intensity level of an X-ray source, said X-ray source comprising:

an X-ray tube having an anode, a cathode, and a filament;

high-voltage circuitry for supplying voltages to the anode and the cathode, said high-voltage circuitry including a controllable voltage regulating stage having a control input and an output; and filament power circuitry for supplying a voltage to the filament;

said method comprising the steps of:

forming a first feedback signal from the output of the controllable voltage regulating stage;

forming a second feedback signal from the anode voltage or quantities proportional thereto;

forming a control signal from the first and second feedback signals; and supplying the control signal to the control input of the controllable voltage regulating stage.

5. A method as claimed in claim 4, characterized in that the step of forming a control signal comprises the steps of:

forming an intermediate control signal related to the difference between the second feedback signal and a reference voltage; and forming the control signal from the difference between the first feedback signal and the intermediate control signal.

6. A method as claimed in claim 4, characterized in that:

the filament power circuitry includes a second controllable voltage regulating stage having a control input and an output; and the method further comprises the steps of:

forming a third feedback signal from the output of the second controllable voltage regulating stage;

forming a fourth feedback signal from the anode current or a quantity proportional thereto;

forming a second control signal from the third and fourth feedback signals; and supplying the second control signal to the control input of the second controllable voltage regulating stage.

7. An X-ray source comprising:

an X-ray tube having an anode, a cathode, and a filament;

high-voltage circuitry for supplying voltages to the anode and the cathode;.

filament power circuitry for supplying a voltage to the filament;

a controllable voltage regulating stage, said controllable voltage regulating stage being part of the high-voltage circuitry and having an output and a control input;

a first comparing means having two inputs and an output, said output connected to the control input of the controllable voltage regulating stage;

a first feedback circuit for supplying a first feedback signal from the output of the controllable voltage regulating stage to one of the inputs of the first comparing means;

a second comparing means having two inputs and an output, said output connected to the other input of the first comparing means;

a second feedback circuit for supplying a second feedback signal from the anode or cathode voltage to one of the inputs of the second comparing means; and a reference signal source connected to the other input of the second comparing means, said reference signal source supplying a signal thereto that is proportional to the desired anode and cathode voltages.

8. An X-ray source as claimed in claim 7, characterized in that the output of the controllable voltage regulating stage is proportional to the anode and the cathode voltages.

9. An X-ray source as claimed in claim 7, further comprising a temporary bypass circuit connected to the input of the first comparing means which is connected to the output of the second comparing means, said temporary bypass circuit temporarily providing a control signal to the first comparing means.

10. An X-ray source as claimed in claim 7, further comprising:

a second controllable voltage regulating stage, said second controllable voltage regulating stage being part of the filament power circuitry and having an output and a control input;

a third comparing means having two inputs and an output, said output connected to the control input of the second controllable voltage regulating stage;

a third feedback circuit for supplying a third feedback signal from the output of the second controllable voltage regulating stage to one of the inputs of the third comparing means;

a fourth comparing means having two inputs and an output, said output connected to the other input of the third comparing means;

a voltage multiplier circuit, said voltage multiplier circuit being part of the high-voltage circuitry and having an input and an output;

a fourth feedback circuit for supplying a fourth feedback signal from the input of the multiplier circuit to one of the inputs of the fourth comparing means, said signal being proportional to the anode current of the X-ray tube; and a second reference signal source connected to the other input of the fourth comparing means, said second reference signal source supplying a signal thereto that is proportional to a desired anode current.

11. An X-ray source comprising:

an X-ray tube having an anode, a cathode, and a filament;

high-voltage circuitry for supplying voltages to the anode and the cathode;

filament power circuitry for supplying a voltage to the filament;

a controllable voltage regulating stage, said controllable voltage regulating stage being part of the high-voltage circuitry and having an output and a control input;

a first feedback circuit for supplying a first feedback signal from the output of the controllable voltage regulating stage;

a second feedback circuit for supplying a second feedback signal from the anode or cathode voltage; and means for forming a control signal from the two feedback signals, said means supplying the control signal to the control input of the controllable voltage regulating stage.

12. An X-ray source as claimed in claim 11, further comprising:

a second controllable voltage regulating stage, said second controllable voltage regulating stage being part of the filament power circuitry and having an output and a control input;

a third feedback circuit for supplying a third feedback signal from the output of the second controllable voltage regulating stage;

a fourth feedback circuit for supplying a fourth feedback signal from the anode current or a quantity proportional thereto; and means for forming a second control signal from the third and fourth feedback signals and for supplying the second control signal to the control input of the second controllable voltage regulating stage.

13. An X-ray source as claimed in claim 11, further comprising means for temporarily bypassing the second feedback circuit when initially switching on the X-ray source.

14. An X-ray source as claimed in claim 11, characterized in that the high-voltage circuitry comprises:

a rectifier stage having an input and an output, the input being arranged to be coupled to an input power source, the output being coupled to the controllable voltage regulating stage;

a DC-to-AC converter stage having an input and an output, the input coupled to the output of the controllable voltage regulating stage; and a voltage multiplier stage having an input coupled to the output of the DC-to-AC converter.

15. An X-ray source as claimed in claim 12, characterized in that:

the first feedback circuit is coupled between an output of the controllable voltage regulating stage and the input of the DC-to-AC converter stage; and the second feedback circuit is coupled between the output of the DC-to-AC converter stage and the input to the voltage multiplier stage.

16. An X-ray source as claimed in claim 15, characterized in that the first and second feedback circuits each comprise a comparator having an operational amplifier.

* * * * *

UNITED STATES PATENT AND TRADEMARK OFFICE
CERTIFICATE OF CORRECTION

PATENT NO. : 4,553,255

DATED : November 12, 1985

INVENTOR(S) : HEIKKI K.J. KANERVA

It is certified that error appears in the above-identified patent and that said Letters Patent is hereby corrected as shown below:

Claim 15, line 1 (column 10, line 16), "12" should read --14--.

Signed and Sealed this

*Thirteenth* Day of *May 1986*

[SEAL]

*Attest:*

DONALD J. QUIGG

*Attesting Officer* *Commissioner of Patents and Trademarks*